United States Patent Office 2,916,510
Patented Dec. 8, 1959

2,916,510

PROCESS FOR PRODUCING PHOSPHINIC ACID PHOSTONES

Albert Y. Garner, Springfield, Mass., assignor to Monsanto Chemical Company, St. Louis, Mo., a corporation of Delaware No Drawing. Application May 21, 1958
Serial No. 736,703

3 Claims. (Cl. 260—461)

This invention relates to phosphinic acid phostones. More particularly, this invention relates to a novel process for the production of intramolecular esters of phosphinic acids corresponding to the general formula:

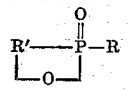

wherein R and R' are groups as hereinafter disclosed.

U.S. 2,648,695 issued to C. W. Smith describes certain intramolecular esters of hydroxy-substituted saturated phosphinic acids. The term "phostones" was coined therein to designate, in general, compounds comprising the phosphorous analogs of the lactones.

It is an object of this invention to provide a new process for the production of phostones.

Another object is to provide a novel process for preparing phosphinic acid phostones from phosphorous acid esters.

These and other objects are attained by reacting an organic ester of a phosphonous acid, i.e., an organic phosphonite, with a dihalogenated hydrocarbon at a temperature of from 100–250° C. The organic phosphonites employed correspond to the general formula:

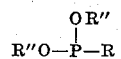

wherein R is either a hydrocarbon or hydrogen radical and each R" is selected from the group consisting of hydrocarbon and hydrogen radicals and silver ions. At least one R" must be a hydrocarbon radical. The dihalogenated hydrocarbons employed correspond to the general formula: X—R'—X wherein X represents halogen atoms and R' is a divalent hydrocarbon radical wherein the two free valencies are located on different carbon atoms which are separated from each other by at least 1 but not more than 3 intervening aliphatic carbon atoms.

The following examples are given in illustration of the invention and are not intended as limitations thereon.

Example 1

A mixture of 100 grams (about 0.5 mol) of 1,3-dibromopropane and 85 grams (about 0.5 mol) of diethyl ethylphosphonite is charged to a reaction vessel. The reaction mixture is heated to an initial temperature of about 155° C. and it is reacted for about 2½ hours, the reaction temperature being maintained within the range of from about 150–170° C. Ethylbromide is continuously distilled from the reaction mixture during the course of this reaction. Fractional vacuum distillation of the reaction mixture yields about 30 grams (about 0.2 mol) of colorless, liquid ethylpropylphosphinic acid phostone

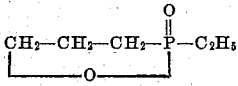

as the fraction boiling at about 83° C. under a pressure of 2 mm. of Hg. The yield is about 40% based upon the 1,3-dibromopropane.

Example II

A mixture of 130 grams (about 0.5 mol) of silver, ethyl isobutylphosphonite and 65 grams (about 0.5 mol) of 1,4-dichlorobutane is charged to a reaction vessel. The reaction mixture is heated to an initial temperature of about 155° C. and is reacted for about 5 hours, the reaction temperature being maintained within the range of from about 150–175° C. Ethylchloride is continuously distilled from the reaction mixture during the course of this reaction. Fractional vacuum distillation of the reaction mixture yields isobutyl-butylphosphinic acid phostone

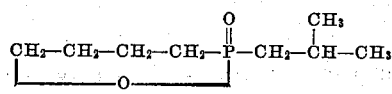

as the fraction boiling at about 103° C. under a pressure of 1 mm. of Hg. The yield is about 18% based upon the 1,4-dichlorobutane.

Example III

A mixture of 45 grams (about 0.2 mol) of 1,5-dibromopentane and 30 grams (about 0.1 mol) of diphenyl phenylphosphonite is charged to a reaction vessel. The reaction mixture is heated to an initial temperature of about 165° C. and is reacted for about 12 hours, the reaction temperature being maintained within the range of from about 165–190° C. The bromobenzene formed during the reaction is removed by distillation at atmospheric pressure. Fractional distillation of the residual reaction mixture yields phenyl-amylphosphinic acid phostone

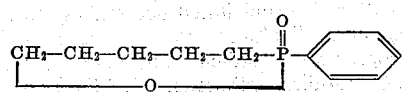

as the fraction boiling at about 120° C. under a pressure of 1 mm. of Hg. The yield is about 15% based upon the diphenyl phenylphosphonite.

The organic phosphonites employed in this invention correspond to the general formula:

In the above formula R is either a hydrogen or hydrocarbon radical. At least one of the R" groups must be a hydrocarbon radical and preferably both R" groups are hydrocarbon radicals of the same kind. However, one R" group may be either hydrogen or a silver ion. Thus, these organic phosphonites are the mono- or di-esters of phosphonous acids or the mono-silver salts thereof. Examples of such include:

(a) Mono-esters of phosphonous acid:
  Mono-ethyl ethylphosphonite
  Mono-propyl benzylphosphonite
  Mono-phenyl phenylphosphonite
  Mono-butyl isobutylphosphonite
  Mono-methyl p-methoxyphenylphosphonite
(b) Di-esters of phosphonous acid:
  Dimethyl phenylphosphonite
  Dibutyl butylphosphonite
  Diphenyl p-bromophenylphosphonite
  Silver, ethyl butylphosphonite
  Silver, ethyl isobutylphosphonite These organic phosphonites are prepared by reacting dihalophosphines with alcohols or phenols in the presence of a tertiary base. The reaction is carried out at moderate temperatures under an inert atmosphere to form either the mono- or di-esters of phosphonous acids, depending upon the stoichiometric proportions used; the reactions proceeding as follows:

(I)
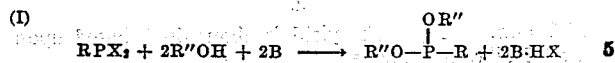

(II)
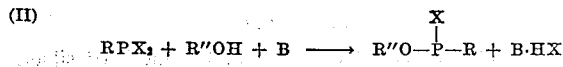

In these formulae, R is a radical as previously described, however, for the purposes of this particular discussion only, R'' is restricted to hydrocarbon radicals. The phosphonous acid esters obtained are isolated by vacuum distillation under an inert atmosphere. The mono-ester halophosphines obtained in reaction (II) are converted to mono-esters of phosphonous acids by the slow hydrolysis of the remaining halogen at moderate temperatures and under an inert atmosphere; this reaction proceeding as follows:

(III)
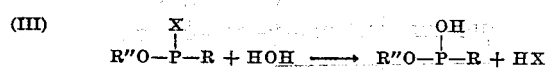

The mono-esters of phosphonous acids obtained in reaction (III) may be reacted with potassium hydroxide and silver nitrate in successive steps to form the silver salt. Thus may be formed each of the organic phosphonites employed in the practice of this invention. For a further description of these materials and alternate methods for their preparation, see "Organophosphorous Compounds," by Kosolapoff, John Wiley and Sons, Inc., 1950, chapter 7, pages 121–147.

The dihalogenated hydrocarbons employed in this invention are those wherein the 2 halogen atoms are located upon different carbon atoms which in turn are separated by at least 1 but not more than 3 carbon atoms. In other words these dihalogenated hydrocarbons are 1,3-dihalo-, 1,4-dihalo- and 1,5-dihalo- aliphatic hydrocarbons and the aryl- and aralkyl-substituted derivatives thereof. Examples of such dihalogenated hydrocarbons include: 1,3-dichloropropane, 1,3-dichlorohexane, 1,3-dibromo-4-tolylbutane, 1,4-dichlorobutane, 1,4-dibromo-5-phenylpentane, 1,5-dibromopentane, 1,5-dichloro-2-ethylpentane, etc.

In preparing the phostones of this invention, the organic phosphonite and the dihalogenated hydrocarbon are reacted in a suitable reaction vessel at a temperature of from 100–250° C. over a period of from 1–40 hours. In a preferred embodiment, the reaction temperature is maintained at from 140–200° C. to attain a more uniform reaction and a higher yield. Theoretically, equimolar proportions of organic phosphonite and dihalogenated hydrocarbon are reacted. However, it has been found that higher yields of phostones are obtained if an excess of the dihalogenated hydrocarbon is used.

Organic or hydrogen halides corresponding to the formula, R''—X, wherein R'' and X are radicals as hereinbefore described, are formed as the by-products of this reaction. In a preferred embodiment of this invention, the R''—X compounds formed have a lower boiling point than the phostone and either of the reactants, i.e., the phosphonite and the dihalogenated hydrocarbon, and are continuously distilled from the reaction mixture during the course of the reaction. This must, of course, be accomplished at a reaction temperature below the 250° C. maximum, conducting the reaction at sub-atmospheric pressure if necessary. One of the advantages of such a process is the obtainment of an increased phostone yield due to elimination of reactive by-products.

Recovery of the phostone from the final reaction mixture is accomplished according to conventional techniques. For example, the phostone may be separated from the residual phosphite and dihalogenated hydrocarbon, and the R''—X by-product, if not previously removed, by fractional distillation at reduced pressure, etc.

The phostones of this invention are non-inflammable compounds corresponding to the general formula:

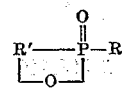

wherein R is either a hydrogen or hydrocarbon radical and R' is a divalent hydrocarbon radical wherein the two free valencies are located on different carbon atoms which are separated from each other by at least 1 but not more than 3 intervening aliphatic carbon atoms. The two free valencies of R' are chemically combined with the phosphorous and oxygen atoms respectively.

These phostones are chemically stable over a broad temperature range. They also have a valuable combination of properties in that they combine relatively low freezing points with relatively high boiling points. For example phenol-amyl-phosphinic acid phostone freezes at below −80° C. and boils at about 300° C. at atmospheric pressure, remaining relatively free flowing under both extremes of temperature.

By reason of the above properties, the phostones of this invention are especially attractive as non-inflammable hydraulic fluids for, e.g., aircraft hydraulic systems, hydraulic presses, etc. The lower molecular weight phostones are fluids at room temperature and are ideally suited for such hydraulics applications. Similarly, the higher molecular weight phostones, which are solids at room temperature, may be used as hydraulic fluids in high temperature applications.

The phostones of this invention have also been found to be useful as plasticizers and/or fire-retardants for plastics. A normally inflammable plastic, wherein from 0.1–5% by weight of a phostone has been incorporated, is slowly consumed while held in a flame, but will extinguish itself once the flame is removed.

*Example IV*

Two batches, A and B, of a polystyrene molding powder are intimately blanded in the following formulations.

|  | Batch A | Batch B |
| --- | --- | --- |
| Polystyrene molding powder _____lb__ | 5.0 | 5.0 |
| Zinc stearate _____gr__ | 0.9 | 0.9 |
| Phostone of Example III _____gr__ | 40.0 | None |

The two blends are then extruded and molded into test slabs measuring 3" x 7" x 0.150". A slab molded from Batch A is held in a Bunsen burner flame and is observed to slowly char and burn. Upon removal from the flame, the slowly burning slab extinguishes itself. A slab molded from Batch B is held in a Bunsen burner flame and is very rapidly ignited. Combustion of this slab continues even after it is removed from the Bunsen flame, until it is reduced to ash.

Other inflammable plastics which may be made fire-resistant with the phostones of this invention include, for example, polyvinyl chloride, polyethylene, polyurethanes, phenolformaldehyde condensates, etc. These phostones may also be employed to prevent the so-called "punking" of foamed phenolformaldehyde condensation resins, especially in boat-hull insulation applications wherein puncture by, e.g., enemy shells, presents a serious problem. In many cases the phostones used should be selected in accordance with the plastic into which it is being incorporated. For example, to insure lasting compatibility, a phostone such as that of Example III which contains a phenoxy-group was selected for use in the polystyrene molding compound in Example IV.

It is obvious that many variations may be made in the products and processes set forth above without departing from the spirit and scope of this invention.

What is claimed is:

1. A process for the preparation of phostones which comprises reacting an organic phosphonite with a dihalogenated hydrocarbon at a temperature of from 100–250° C.; said phostones corresponding to the general formula:

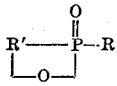

wherein R is a member selected from the group consisting of hydrogen and hydrocarbon radicals and R' is a divalent saturated hydrocarbon radical wherein the two free valencies are located on different carbon atoms which are separated from each other by at least 1 and not more than 3 intervening aliphatic carbon atoms, said free valencies being chemically combined with the respective atoms designated in said formula by P and O; said organic phosphonite being selected from the group consisting of the mono- and di-esters of phosphonous acids corresponding to the general formula:

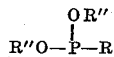

wherein R is a member as above described and the R'' members are selected from the group consisting of silver ions and hydrogen and monovalent hydrocarbon radicals free of olefinic and acetylenic unsaturation, at least one R'' being a monovalent hydrocarbon radical free of olefinic and acetylenic unsaturation; said dihalogenated hydrocarbon corresponding to the general formula:

$$X—R'—X$$

wherein X represents halogen radicals and R' is a divalent hydrocarbon radical as above described.

2. A process for the preparation of phostones which comprises reacting an organic phosphonite with a dihalogenated hydrocarbon at a temperature of from 100–250° C.; said phostones corresponding to the general formula:

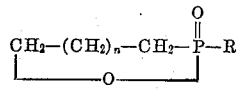

wherein R is a member selected from the group consisting of hydrogen and hydrocarbon radicals and $n$ is an integer of from 1 to 3; said organic phosphonite being selected from the group consisting of the mono- and di-esters of phosphonous acids corresponding to the general formula:

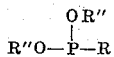

wherein R is a member as above described and the R'' members are selected from the group consisting of silver ions and hydrogen and monovalent hydrocarbon radicals free of olefinic and acetylenic unsaturation, at least one R'' being a monovalent hydrocarbon radical free of olefinic and acetylenic unsaturation; said dihalogenated hydrocarbon corresponding to the general formula:

$$X—CH_2—(CH_2)_n—CH_2—X$$

wherein X represents halogen radicals and $n$ is an integer of from 1 to 3 as above described.

3. A process as in claim 2 wherein both R'' members of the organic phosphonite are monovalent hydrocarbon radical free of olefinic and acetylenic unsaturation.

References Cited in the file of this patent

UNITED STATES PATENTS 2,648,695    Smith _____ Aug. 11, 1953